US007395965B2

(12) United States Patent
Franks, Jr.

(10) Patent No.: US 7,395,965 B2
(45) Date of Patent: Jul. 8, 2008

(54) MOBILE BULK DEPOSITOR

(75) Inventor: Thedfred E. Franks, Jr., Highland Village, TX (US)

(73) Assignee: Giesecke & Devrient America, Inc., Dulles, VA (US)

( * ) Notice: Subject to any disclaimer, the term of this patent is extended or adjusted under 35 U.S.C. 154(b) by 0 days.

(21) Appl. No.: 11/633,516

(22) Filed: Dec. 5, 2006

(65) Prior Publication Data

US 2007/0125841 A1 Jun. 7, 2007

Related U.S. Application Data

(60) Provisional application No. 60/742,566, filed on Dec. 6, 2005.

(51) Int. Cl.
*G06K 7/00* (2006.01)

(52) U.S. Cl. ...................................... 235/440; 235/379

(58) Field of Classification Search .................. 235/379
See application file for complete search history.

(56) References Cited

U.S. PATENT DOCUMENTS

| | | | | |
|---|---|---|---|---|
| 5,676,231 | A | 10/1997 | Legras et al. | |
| 5,804,804 | A * | 9/1998 | Fukatsu et al. | 235/379 |
| 5,826,680 | A | 10/1998 | Takemoto et al. | |
| 5,890,440 | A | 4/1999 | Spur | |
| 5,957,776 | A | 9/1999 | Hoehne | |
| 6,014,649 | A * | 1/2000 | Kobayashi et al. | 705/43 |
| 6,398,000 | B1 | 6/2002 | Jenrick et al. | |
| 6,460,848 | B1 | 10/2002 | Soltys et al. | |
| 6,579,180 | B2 | 6/2003 | Soltys et al. | |
| 6,595,857 | B2 | 7/2003 | Soltys et al. | |
| 6,641,483 | B1 | 11/2003 | Luciano et al. | |
| 6,663,490 | B2 | 12/2003 | Soltys et al. | |
| 6,676,517 | B2 | 1/2004 | Beavers | |
| 6,688,979 | B2 | 2/2004 | Soltys et al. | |
| 6,745,887 | B2 | 6/2004 | Heidel et al. | |
| 6,845,905 | B2 * | 1/2005 | Blad et al. | 235/375 |
| 6,889,849 | B2 | 5/2005 | Heidel et al. | |
| 6,896,620 | B1 | 5/2005 | Luciano et al. | |
| 6,968,787 | B2 | 11/2005 | Heidel et al. | |
| 2003/0155209 | A1 | 8/2003 | Fujimoto | |
| 2004/0002386 | A1 | 1/2004 | Wolfe et al. | |
| 2004/0033832 | A1 | 2/2004 | Solomon | |

(Continued)

FOREIGN PATENT DOCUMENTS

WO WO 2004/081888 9/2004

(Continued)

*Primary Examiner*—Steven S. Paik
*Assistant Examiner*—Tuyen Kim Vo
(74) *Attorney, Agent, or Firm*—Bacon & Thomas, PLLC

(57) ABSTRACT

A free-standing bulk depositor includes wheels or other mechanical contrivances that enable the unit to be moved from place to place, for example to different tables on the floor of a casino, and includes various currency and/or document processing devices, including a transport mechanism that feeds a stack of documents past at least one sensing/imaging device, a logic unit that sends the documents to appropriate cassettes or drop boxes depending on the type of document and whether the document can be authenticated, and an escrow spool that holds suspect documents while images of the suspect documents are being reviewed in case the logic unit cannot determine whether a document is authentic. The documents may be banknotes, tickets, vouchers, coupons, or other documents having an identifiable value.

20 Claims, 4 Drawing Sheets

U.S. PATENT DOCUMENTS

| | | | |
|---|---|---|---|
| 2005/0040225 | A1 | 2/2005 | Csulits et al. |
| 2005/0121286 | A1 | 6/2005 | Iannello et al. |
| 2005/0126880 | A1 | 6/2005 | Iannello et al. |
| 2005/0126881 | A1 | 6/2005 | Iannello et al. |

FOREIGN PATENT DOCUMENTS

| | | |
|---|---|---|
| WO | WO 2005/098767 | 10/2005 |
| WO | WO 2006/077423 | 7/2006 |

* cited by examiner

MOBILE BULK DEPOSITOR

This application claims the benefit of provisional U.S. patent application Ser. No. 60/742,566, filed Dec. 6, 2005.

BACKGROUND OF THE INVENTION

1. Field of the Invention

This invention relates to a device arranged to receive and validate currency and other items of value, including tickets, vouchers, coupons, markers, scrip, match play documents, and so forth. The device is suitable for use in environments where large numbers of the printed items of value are exchanged in a short interval of time. By way of example and not limitation, the device may be used at a gaming table of a casino.

Unlike previous bill acceptors designed for use in gaming environments, the device of the invention is mobile and free-standing, thereby enabling the device to easily be move to wherever needed, and to be removed and replaced for service or maintenance.

Furthermore, instead of simply rejecting items that cannot be internally validated, the device of the invention includes an escrow feature that enables remote validation of suspect notes while other notes are being processed, thereby enabling play to continue with minimal inconvenience to the dealer and legitimate players.

2. Description of Related Art

Traditionally, when a dealer at a casino receives a stack of cash from a player for the purpose of purchasing chips, the dealer simply drops the cash through a slot in the table into a secure capture drop box. The slot is positioned to enable the dealers to conduct transactions without taking their eyes off the table, and without placing their hands or any media out of the view of the security camera system that monitors the table. Secure capture drop boxes may be used in connection with a variety of table games, such as black jack, craps, roulette, and baccarat.

A problem with the traditional system is that it is difficult to count stacks of notes while game play is proceeding, and virtually impossible to validate or authenticate the notes until the capture box has been physically removed from the table and taken into soft count to be verified. This has long been viewed as a security risk to both the casino and gaming commissions, and therefore there has been a long felt need for ways to automate note (i.e., cash or other items or documents of value) acceptance and validation, in order to more efficiently count and validate notes as they are received at the table, thereby reducing the risk of employee theft and increasing the casino's protection against counterfeit activity.

In the casino environment, there are several requirements for automated note acceptors. First, the device should be at least as fast and easy for the dealer to use as the conventional slot and drop box, so that use of the device does not slow down a game in progress. Second, all transactions and handling of notes or other documents of value must be within full view of the casino security cameras. Third, the device should be able to accept a variety of notes, including tickets, vouchers, and the like, as well as currency of a variety of different denominations. Fourth, the device should be reliable with a minimal number of jams and easy removal of the jams, and the ability to handle notes of poor quality. Fifth, the device should not be tied to a particular table but rather should be able to be positioned wherever needed, and in particular should be easily removed and replaced if repair is necessary. Sixth, the system should have the ability to retain suspected counterfeit notes for further investigation and to prevent re-use.

This problem has been addressed in a series of patents and publications owned by JCM American Corporation (the JCM patents and publications). These patents and publications, including U.S. Pat. Nos. 6,745,887, 6,889,849, and 6,968,787, and U.S. Patent Publication Nos. 2005/0121286, 2005/0126880, and 2005/0126881, disclose automatic bill acceptors that are specifically designed for use at gaming tables, and that are designed to enable a dealer to insert stacks of bills, tickets, or other notes given to the dealer in exchange for gaming chips, and to validate the notes before game play proceeds to ensure that the notes are not counterfeit. However, there are at least two disadvantages to the bill acceptor designs disclosed in the JCM patents and publications.

The first disadvantage is that JCM takes the approach of mounting the bill acceptors directly to the gaming table, in a manner similar to the standard secure drop box. As a result, the table must be shut down whenever repair or maintenance is required, the repair or maintenance must be carried out on the casino floor in view of casino patrons (casinos never close), and a bill acceptor must be provided for every gaming table even though not all tables will necessarily be in use at any given time.

The second disadvantage is that the JCM table system rejects any notes that cannot be automatically validated, irrespective of the reason that the bill cannot be validated, resulting in a relatively high number of game interruptions and embarrassment or inconvenience to persons presenting notes that cannot be automatically validated for reasons other than inauthenticity.

Other patents that are of background interest because they disclose gaming or wagering systems other than gaming table bulk depositors, or subsystems that might possibly be used in or that are related to bill acceptors, include U.S. Pat. No. 5,826,680, which describes a bill handling system for accepting bills taken in game play media lending machines and for transporting the bills to a cash box, as well as a system of secure bill receiving cassettes; U.S. Pat. No. 5,957,776, which describes an electronic monitoring system for a gaming table integrated with a casino central management system, in which information is tracked regarding operations of the gaming table, the dealer, the floor manager or player in a pit, and a cash box system that provides bill denomination signals to a host control system; U.S. Pat. No. 6,460,848, which discloses a system for automatically monitoring playing and wagering of a game, in particular a chip and card tracking system and table monitoring logic verifying game play, cash box processing, player analysis and employee analysis; U.S. Pat. No. 6,595,857, which discloses a system for tracking playing cards at a gaming table; U.S. Pat. No. 6,579,180, which discloses a casino gaming table monitoring system including a card deck reader, chip tray reader, currency authenticator including bill imaging; and U.S. Pat. No. 6,663,490, which discloses an electronic gaming table monitor similar to that described in U.S. Pat. No. 6,460,848; U.S. Pat. No. 6,676,517, which discloses an electronic gaming table monitor system including position data; cards; dice; roulette wheels and other data; wager data; payout system; electronic paddle used in a drop slot of the table; and communication with a central server; U.S. Pat. No. 6,688,979, which discloses game table play tracking, a chip reader, card reader, and table image, with play tracking and communication with a central server; U.S. Patent Publication No. 2004/0002386, which describes an electronic casino information management system that enables conducting casino business at any location within the casino based on the use of a hand-held computing device, and U.S. Patent Publication No. 2004/0033832, which describes a closed system for counting monetary instruments from a plurality of games within a casino, a bill validator that receives, validates and counts monetary instruments and transmits data to a central processor.

Also of background interest are U.S. Pat. No. 4,755,941, which describes a chip tray monitoring system; U.S. Patent Publication No. 2003/0155209, which describes a portable safe arrangement for currency transport system associated with a game card vending machine; U.S. Pat. No. 5,676,231, which describes a secure cash box system for currency accepting machines; U.S. Pat. No. 5,890,440, which describes a cash box arrangement for a gaming table; U.S. Pat. No. 6,641,483, which describes a security cabinet arrangement for electronic casino game controllers; and U.S. Pat. No. 6,845,905, which describes a casino cash transporter with a secure cash box.

SUMMARY OF THE INVENTION

It is accordingly a first objective of the invention to provide a mobile, free-standing device that can accept and authenticate stacks of currency or other items of value, in order to facilitate rapid transactions such as occur at a gaming table of a casino.

It is a second objective of the invention to provide a mobile device capable of automatically authenticating stacks of currency, that includes back up imaging to permit visual inspection of suspect notes, and that escrows the notes during the visual inspection while still processing other notes in the stack without interfering with game play or transaction rates.

It is a third objective of the invention to provide a mobile bulk depositor capable of processing stacks of currency and other items or documents of value, including tickets, vouchers, coupons, markers, scrip, match play documents, and so forth.

These objectives are accomplished, in accordance with the principles of a preferred embodiment of the invention, by providing a free-standing mobile bulk depositor unit situated on wheels or other mechanical contrivances that enable the unit to be moved from place to place, for example to gaming tables on the floor of a casino, preferably with a height adjustment mechanism, and that contains various currency and/or document processing devices, including a transport mechanism that feeds a stack of documents past at least one sensor, a logic unit that sends the documents to appropriate cassettes or secured drop boxes depending on the type of document and whether the document can be validated or authenticated, and an escrow spool that escrows suspect documents while an image of the document is being validated or authenticated at a remote location by appropriately skilled personnel, without interrupting game play or processing of other documents in the stack.

Those skilled in the art will appreciate that the list of capabilities or functions performed by the apparatus of the invention, as described below, is not intended to be exhaustive and that other functions and/or devices may be added without departing from the scope of the invention.

DETAILED DESCRIPTION OF THE PREFERRED EMBODIMENTS

Figure 1:
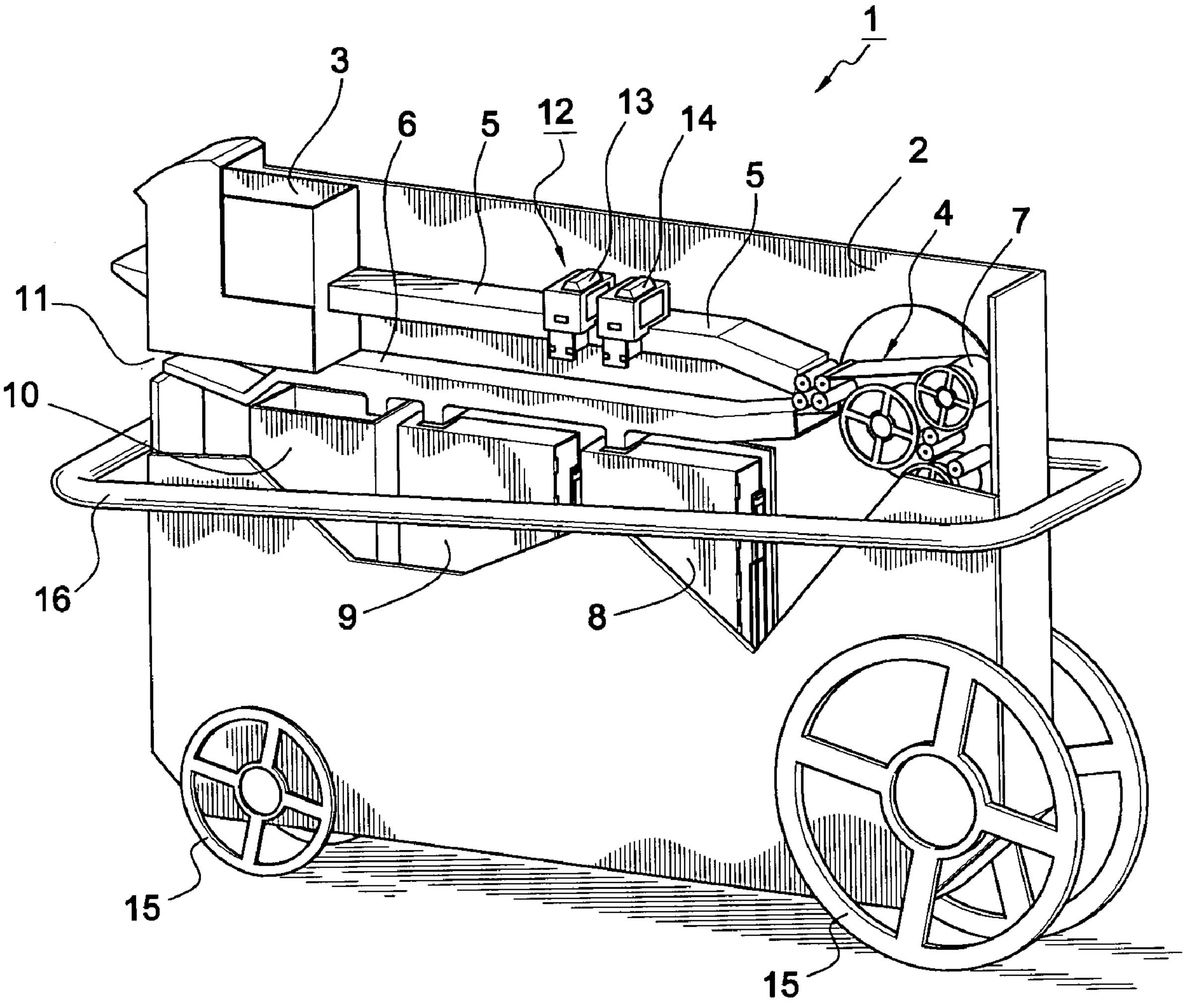
FIG. 1 is a perspective view of a mobile bulk depositor constructed in accordance with the principles of a preferred embodiment of the invention.

FIG. 1 is a perspective view of a mobile bulk depositor 1 constructed in accordance with the principles of a preferred embodiment of the invention. Bulk depositor 1 includes a housing 2 in which are mounted a note/currency input hopper 3 and a note/currency transport mechanism 4 including passages 5 and 6 and escrow spool 7. Also contained or mounted in the bulk depositor are secure cassettes 8,9, secure drop box 10, and a reject passage/slot 11. Notes and/or currency are transported by transport mechanism 4 from input 3 to escrow spool 7, one of cassettes 8 and 9, secure drop box 10, or reject slot 11 by means of the transport mechanism 4. Also included in the mobile bulk depositor 1 are a sensor set 12 including note/currency sensing and/or imaging units 13,14 positioned to sense or image notes and/or currency being transported through passage 5. Movement of the depositor 1 is facilitated by wheels 15 and a handle 16, while the height of the depositor may also be made adjustable for ease-of-operation and to facilitate use at different locations.

Preferably, the input hopper 3 has a cover (not shown) that can be opened to enable the operator to place stacks of items into the hopper. A slot may also be provided that enables feeding of individual items. The cover is preferably transparent to enable the operator to determine at a glance whether items in the hopper are in a position for proper feeding, and to observe the progress of feeding. The escrow spool 7, cassettes 8,9, secure drop box 10, and transport mechanism 4 are accessible through lockable service doors (also not shown) to enable removal of the cassettes and drop box to a secure location, and service or maintenance of the transport mechanism. The cassettes and secure drop box are preferably separately lockable.

Figure 2:
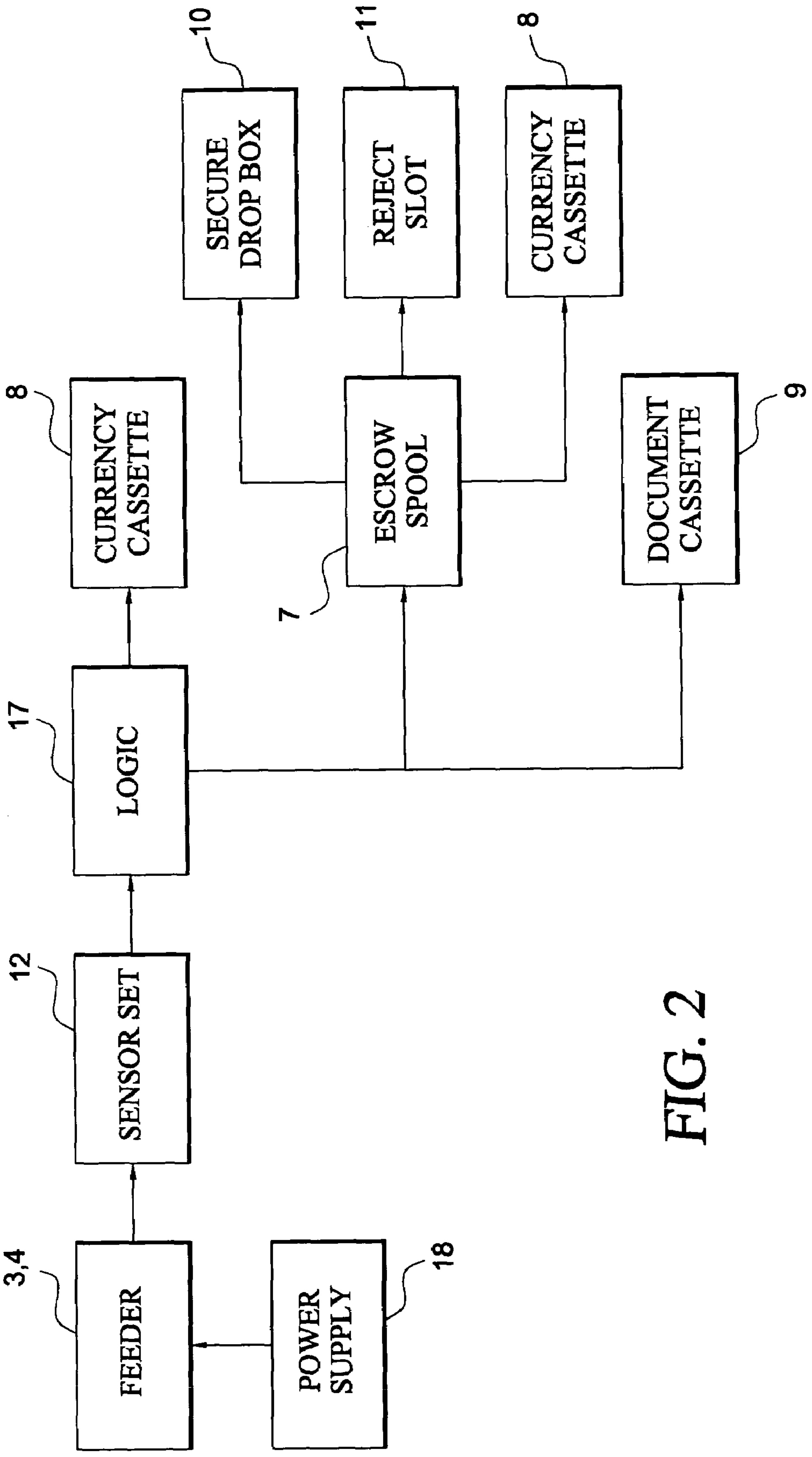
FIG. 2 is a block diagram showing a document feed path for the mobile bulk depositor of FIG. 1.

As shown in FIG. 2, escrow spool 7 may be a conventional spool stacker to which notes are selectively diverted from the transport passage, in which notes may be held for an arbitrary interval while other notes continue to be transported, and from which notes are fed back into the transport passage. The escrow spool 7 is used as an escrow bin to temporarily store items that are not recognized or that cannot be validated and therefore are suspected as being counterfeit.

Currency cassette 8 stores currency that is determined to be authentic, as well as separator cards that indicate a change of users or shifts, and sorts the currency according to denomination based on determinations made by a central processing or logic unit 17, described below, in response to data sensed as the documents are transported past sensor set 12. Although just one currency cassette 7 is shown, multiple currency cassettes may be employed, for example to handle currency from different countries.

A number of currency receiving cassettes are currently used in other types of deposit-accepting devices, and the mobile bulk depositor of the invention may make use of any such currency cassettes, or currency cassettes adapted particularly for the mobile bulk depositor. The available cassettes are designed to accept and sort currency of different denominations for storage until the cassette is removed from the deposit accepting device and opened under secure conditions by appropriate personnel.

Document cassette 9 holds documents other than currency, such as tickets, coupons, vouchers, match play documents, markers, or other items of value that might be used as payment at a gaming table, as well as header cards. Again, although just one document cassette 9 is shown, multiple cassettes designed to hold different types of items of value or documents may be included. In addition, the currency cassette 8 may be configured to hold documents other than currency.

The secure drop box 10 may be used to store non transportable items including time sheets and other forms filled out by the operator, coupons or markers that cannot be automatically read or transported, and miscellaneous items such as chips and coins, and to capture suspect currency notes for manual review. In addition, the secure drop box 10 may be configured as a repository for transported documents such as barcoded items, fill slips, and so forth, as described below. Preferably, secure drop box 10 includes an external access slot (not shown) enabling items to be manually dropped into the box, so that the secure drop box 10 may be used as a manual drop capture device when the transport system is not functional.

As indicated above, the operation and internal details of the secure currency or document accepting cassettes and drop box form no part of the present invention. In addition, numerous currency or note feeders are known to those skilled in the art, and the invention is not intended to be limited to a specific document feeding or transport mechanism. Power for the transport mechanism, cassettes, logic unit, and other functions of the depositor may be supplied by any convenient power supply 18, such as an onboard battery or connection to a power outlet, and may include transformers and other well-known power circuits and devices.

The sensor set 12 is connected to a logic circuit or processing unit 17 that determines whether a document is sent to the currency cassette 8 or document cassette 9. In addition to currency identification sensors, it includes an image capture device. If the processing unit 17 determines the document to be currency but cannot immediately determine whether a document being fed is authentic, it is held in the escrow spool 7 while an image of the suspect currency is sent to an external location and displayed for visual inspection. If the currency is judged to be authentic, then it may be sent to the currency cassette 8. If a determination of authenticity still cannot be made, the suspect currency is sent to the drop box 10 or ejected through the reject slot 11. Alternatively, all suspect documents may be sent to the drop box 10 or ejected even if ultimately judged to be authentic, or the suspect documents may optionally be sent to the currency cassette even if judged to be inauthentic. Documents other than currency that are suspect or judged to be inauthentic may be simply ejected through the reject slot 11, or sent to an appropriate cassette or to the drop box depending on the configuration of the depositor. Those skilled in the art will appreciate that the ultimate destination of suspect documents or currency will depend on handling protocols or cassette configurations that may be varied in a number of ways, and therefore that the invention is not to be limited to a particular destination for currency or documents following the determination of authenticity.

Sensor unit 12 may also include, in addition to the image capture device, a thickness sensor that is set determine the note thickness and identify multifeed situations, denomination sensors that identify the value of the note based on an adaptation of the note, UV sensors that check for UV properties of the note to ensure authenticity, magnetic sensors that check the magnetic properties of the note to ensure authenticity, and/or infrared (IR) sensors that check IR property characteristics for authenticity.

In order to communicate images and other data to an external location or system, the mobile bulk depositor preferably includes at least one communications interface. The interface enables data communications with a central system in order to log deposits as well as to transmit images of suspect notes for visual inspection, and further to carry out other transactions such as identification of a player via a card, crediting or debiting of an account, and generate an audit trail. The interface may be a wireless interface, or be in the form of an connection port that can be plugged into a network connection, or both.

In order to enable processing of bar-coded documents such as ticket in ticket out (TITO) documents, sensor set 12 may further include a scanner that reads the bar codes on the ticket, voucher, coupon, match play document or marker, and verifies the amount printed on the ticket for immediate payment.

In addition, the mobile bulk depositor may include a card reader that reads cards for the purpose of identifying a player, logging transactions, electronic funds transfers, and any other card-based transactions. In that case, ancillary devices such as a display screen, biometric input devices, and so forth, may also be included.

Figure 3:
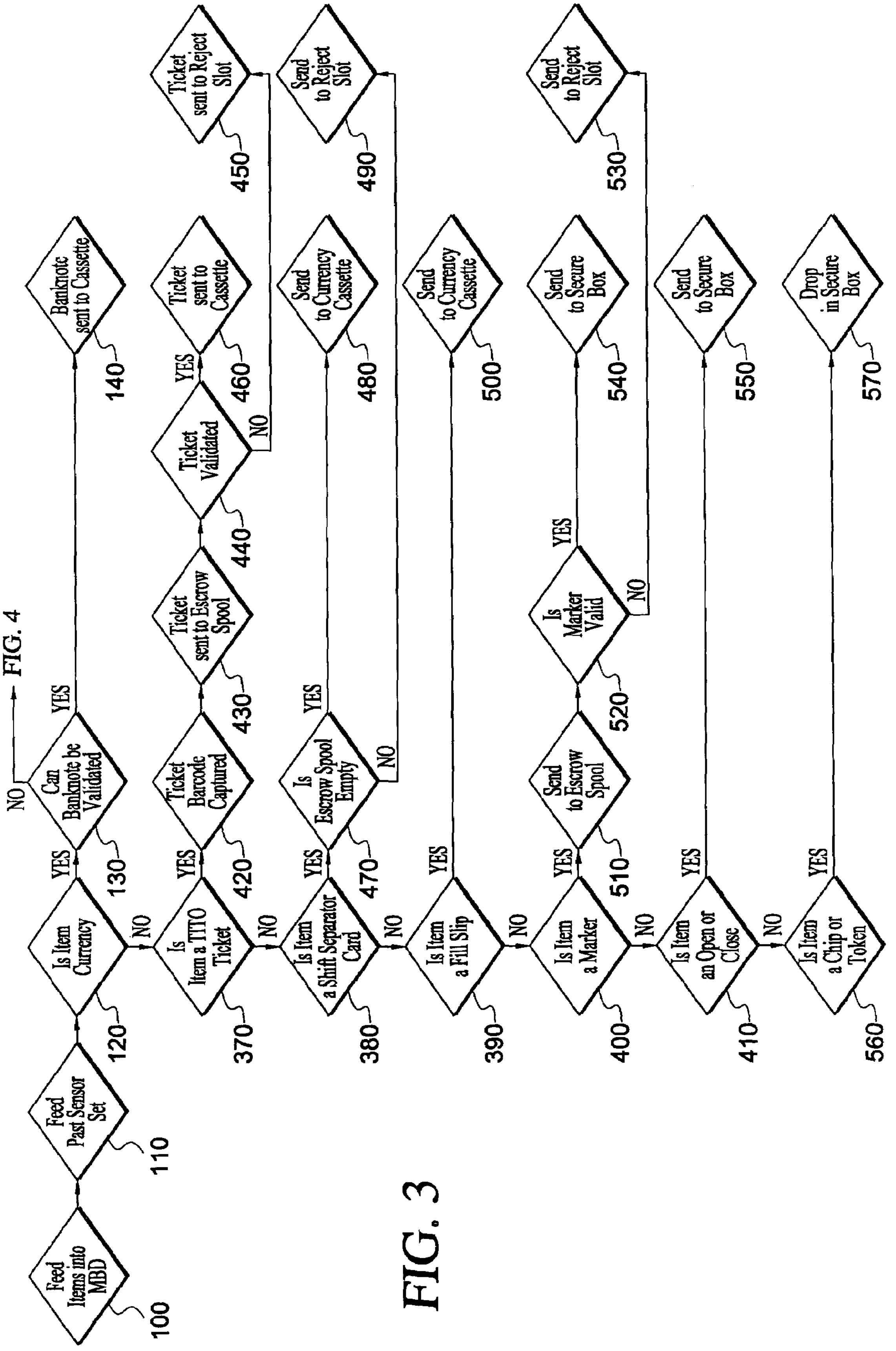
FIG. 3 is a flowchart illustrating the manner in which items are processed by the mobile bulk depositor of FIG. 1.
Figure 4:
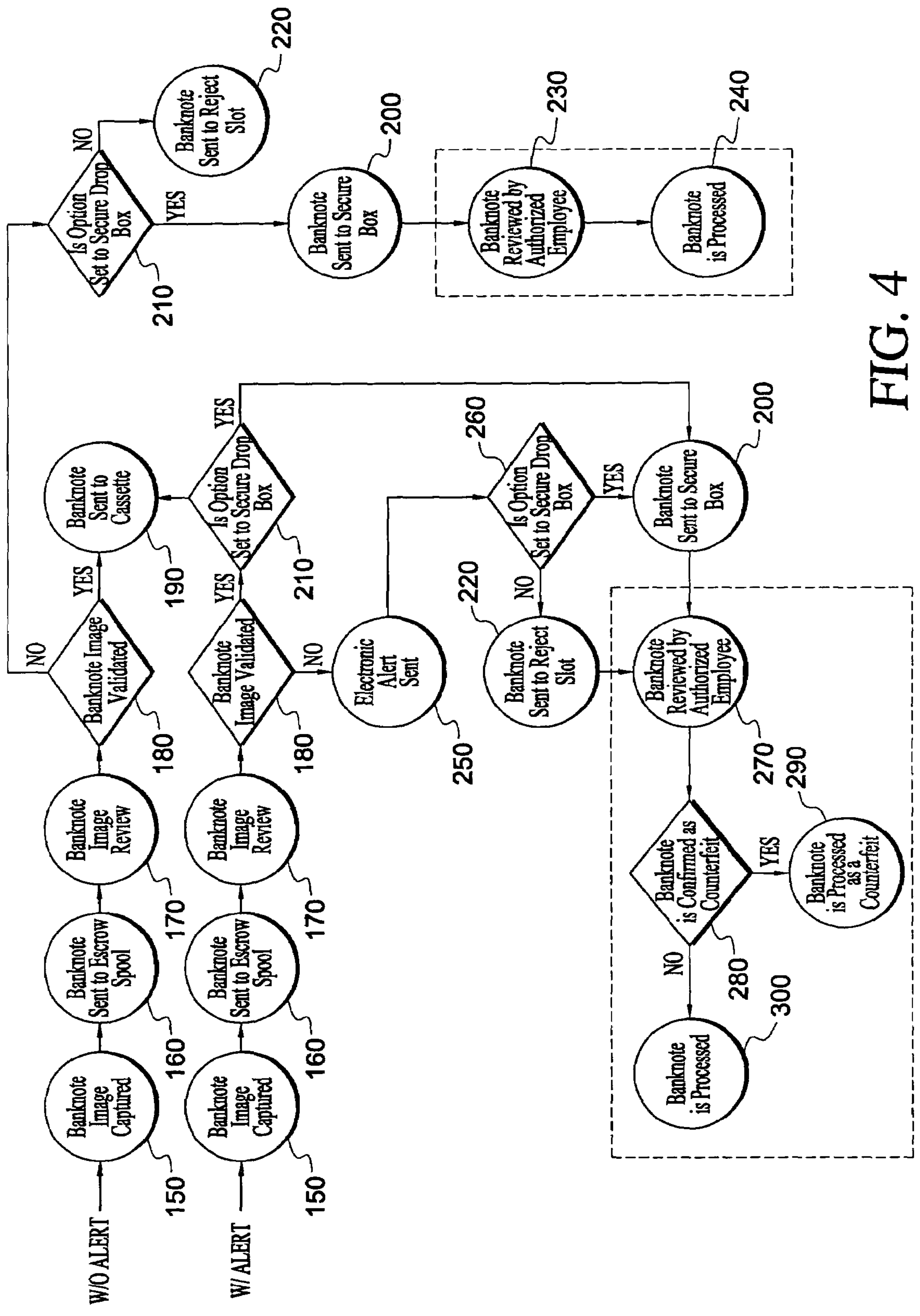
FIG. 4 is a continuation of the flowchart illustrated in FIG. 3.

The mobile bulk depositor of the preferred embodiment operates in the manner illustrated in the flowcharts of FIGS. 3 and 4, under control of a central processing or computing unit illustrated schematically as logic circuit or processing unit 17. It will be appreciated that processing unit 17 may take a variety of forms, including single or multiple processors that run any of a number of available operating systems. Also, the functions of the mobile bulk depositor may be software programmable, hardwired, or a combination of programmable and hardwired. Consequently, numerous variations in the software sequence illustrated in FIGS. 3 and 4 are possible, including the omission or addition of steps, and changes in the illustrated sequence.

Step 100 shown in the flowchart of FIG. 3 is the step of feeding items into the depositor, which involves having the operator place a stack of documents into the input hopper 3, feed documents into an optional input slot that leads to the input hopper, or a combination of stacking and individual feed. When the door to the input hopper is closed, or the transport mechanism 4 is activated, either automatically or optionally by a manual start button or switch, the documents are automatically fed past the sensor set 12 (step 110) and a decision is made by processing unit 17 as to whether the document is currency or another type of items of value (step 120).

If the item is currency, then the depositor seeks to validate or authenticate the currency (step 130). If the currency can be authenticated during the time available for feeding the document through the sensor set, then the currency is routed to the currency cassette 8 for sorting and storage (step 140).

If the currency cannot be validated, then the processing software determines whether to flag the currency as a possible counterfeit (step 142), in which case an alert may be sent to appropriate personnel (step 144). In either case, as indicated by the common reference numerals in the respective suspect counterfeit and non-suspect flow paths, an image of the banknote is captured by the sensor set 12 (step 150), the banknote is sent to the escrow spool 7 (step 160), an image of the banknote is sent to a central location and displayed for visual inspection by appropriately skilled personnel (step 170). The reviewer then sends back a decision on validity or authenticity to the depositor (step 180).

In the first flow path, if the image is validated by the reviewer, the banknote is sent to the currency cassette 8 (step 190). If the note cannot be validated, a secure drop box option is checked (step 210) and the note is either sent to the reject slot 11 (step 220) or to the secure drop box (step 200) depending on whether the drop box option is selected. If the note is sent to the secure drop box, it can be checked by an authorized employee (step 230) after removal of the drop box and subsequently processed (step 240).

In the second flow path, the drop box option (step 210) enables the note to be sent to the secure drop box (step 200) rather than the currency cassette 8 (step 190) even if the reviewer has indicated authenticity, so that the reviewer's decision can be independently checked at a later time. If the note is not validated or authenticated by the reviewer, an alert is sent to an appropriate authority (step 250) and the suspect note can either be sent to the reject slot 11 (step 220) or to the secure drop box (step 200) based on a determination as to whether the drop box option has been selected (step 260). Since the alert has been sent, the authorized personal will have arrived at the gaming table and can review the note (step 270) upon ejection from the reject slot 11 or upon removal of the drop box, and a determination as to whether the note is authentic or still considered to be suspect can be made without further delay (step 280). Processing of the note as counterfeit (step 290) or not (step 300), as well as appropriate action against the person passing the counterfeit note, can then be immediately taken.

Irrespective of whether the flow path includes an alert, while the suspect banknote is being escrowed and an image of the note is being visually inspected, additional banknotes may continue to be processed by feeding them past the sensors and escrowing any additional suspect notes.

Returning to FIG. 3, if an item being transported past the sensor set 12 is not currency, as determined at step 120, then determinations are made as to whether the item is a barcoded item (step 370), such as by way of example and not limitation a TITO ticket, a shift separator card (step 380), fill slip (step 390), open or close document (step 400), or other document (step 418) In addition, the operator determines if the item is a coin, chip, or token (step 410) or electronic funds transfer (EFT) card, and may also determine that the item is another document that must be dropped directly into the drop box.

If the item is a barcoded item such as a ticket, the barcode is captured (step 420), the ticket is sent to the escrow spool 7 (step 430) and the number represented by the barcode is sent to a central system for validation (step 440). If the ticket number is not valid, the ticket is fed to the reject slot and ejected from the depositor (step 450). If the ticket number is valid, the ticket may be sent for storage to the document cassette 9 or, depending on how the depositor is configured, to the drop box 10 or currency cassette 8 (step 460).

As illustrated in FIG. 4, if the item is a shift separator card, then the escrow spool is checked to determine is there is a note or notes awaiting verification (step 470). If not, the card is sent to the currency cassette 8 or optionally to the drop box 10 to indicate the last note received in the shift (step 480). If a note is present in the escrow spool, then the card is rejected (step 490) and must be re-inserted when verification is complete. Preferably, an indicator of some type is included to notify the operator when the verification is complete.

If the item is a fill slip, then the slip is simply sent to the currency cassette 8, document cassette 9, or drop box 10 (step 500).

If the item is an open or close form, the form is checked for validity (step 510) and, depending on the result, the form is either sent to the currency cassette 8, document cassette 9, or drop box 10 (step 520), or to the reject slot 11 (step 530). Chips and tokens left over at close are also inserted directly into the secure drop box (step 540).

Finally, electronic funds transfer (EFT) cards are processed through EFT readers if available (step 550), while other items that cannot be sent through the document transport mechanism are dropped into the secure drop box (step 560).

Having thus described a preferred embodiment of the invention in sufficient detail to enable those skilled in the art to make and use the invention, it will nevertheless be appreciated that numerous variations and modifications of the illustrated embodiment may be made without departing from the spirit of the invention, and it is intended that the invention not be limited by the above description or accompanying drawings, but that it be defined solely in accordance with the appended claims.

I claim:

1. A mobile bulk depositor, comprising:

a secure casing;

mechanical contrivances for enabling the casing to be moved;

an input hopper for receiving documents including currency and other documents of value;

at least one sensor;

a logic device connected to the at least one sensor;

at least one secure cassette;

a drop box;

a communications interface for transmitting data captured by the at least one sensor to an external location for review by an external reviewer;

a transport mechanism, including an escrow spool for temporarily holding documents, said transport mechanism being arranged for:

a. transporting a document from the input hopper past the at least one sensor, b. in response to a determination of validity or authenticity by the logic device, transporting the document either to the at least one secure cassette in case the document is determined to be valid or to the escrow spool in case a validity or authenticity determination cannot be made, and c. transporting a document being held in the escrow spool pending review to the at least one secure cassette, the drop box or a reject slot depending on the determination by the external reviewer as to whether the document is valid or authentic.

2. A mobile bulk depositor as claimed in claim 1, wherein said at least one sensor includes currency identification sensors and an image capture device, said image capture device being arranged to capture an image of currency that cannot be identified by said currency identification sensors, and send the image to a reviewer's station while currency is being held in said escrow spool.

3. A mobile bulk depositor as claimed in claim 1, wherein said at least one secure cassette is a currency receiving cassette arranged to receive and sort multiple currency denominations.

4. A mobile bulk depositor as claimed in claim 3, further comprising a second cassette for receiving documents other than currency.

5. A mobile bulk depositor as claimed in claim 4, wherein said documents other than currency include at least one of the following documents: tickets, markers, vouchers, coupons, and match play documents.

6. A mobile bulk depositor as claimed in claim 5, wherein said at least one sensor includes a bar code reader.

7. A mobile bulk depositor as claimed in claim 1, wherein said casing includes a slot for directly depositing items into the drop box.

8. A mobile bulk depositor as claimed in claim 1, wherein said input hopper includes a door that is opened in order to place a stack of documents into the input hopper, and which activates the transport mechanism upon closure.

9. A mobile bulk depositor as claimed in claim 1, wherein said transport mechanism continues to transport documents from the at least one sensor to the at least one secure cassette while a document is being held in the escrow spool.

10. A method of accepting documents in a mobile bulk depositor including a secure casing; mechanical contrivances for enabling the casing to be moved; an input hopper for receiving documents including currency and other documents of value; at least one sensor; a logic device connected to the at least one sensor; at least one secure cassette; a drop box; a communications interface for transmitting data captured by the at least one sensor to an external location for review by an external reviewer; and a transport mechanism, including an escrow spool for temporarily holding documents, comprising the steps of:

a. transporting a document from the input hopper past the at least one sensor, b. in response to a determination of validity or authenticity by the logic device, transporting the document either to the at least one secure cassette in case the document is determined to be valid or to the escrow spool in case a validity or authenticity determination cannot be made, and c. transporting a document being held in the escrow spool pending review to the at least one secure cassette, the drop box, or a reject slot depending on the determination by the external reviewer as to whether the document is valid or authentic.

11. A method as claimed in claim 10, further comprising the steps of capturing an image of currency that cannot be identified by currency identification sensors, and sending the image to a reviewer's station while currency is being held in said escrow spool.

12. A method as claimed in claim 11, further comprising the step of, upon sending currency to the at least one secure cassette, sorting the currency according to denomination.

13. A method as claimed in claim 11, further comprising the step of determining whether the document is currency or another type of document and, if the document is another type of document, validating the other type of document.

14. A method as claimed in claim 13, wherein the other type of document is a ticket, marker, voucher, coupon, or match play document.

15. A method as claimed in claim 14, wherein the step of validating the other type of document includes the step of reading a number represented by a bar code and sending the number to a central system for validation.

16. A method as claimed in claim 15, further comprising the step of, if the number is valid, sending the other type of document to the at least one secure cassette, another cassette arranged to receive said other type of document, or to the drop box.

17. A method as claimed in claim 15, further comprising the step of, if the number is invalid, sending the other type of document to the drop box or reject slot.

18. A method as claimed in claim 11, further comprising the step of directly depositing items that cannot be transported by the transport mechanism directly into the drop box.

19. A method as claimed in claim 11, further comprising the step of activating the transport mechanism upon closure of a door that provides access to the input hopper.

20. A method as claimed in claim 10, further comprising the step of continuing to transport documents from the at least one sensor to the at least one secure cassette while the document is being held in the escrow spool.

* * * * *